Nov. 2, 1965 R. M. SANDERS 3,215,359
POWER DRIVEN FISHING REEL
Filed Nov. 5, 1962 2 Sheets-Sheet 2
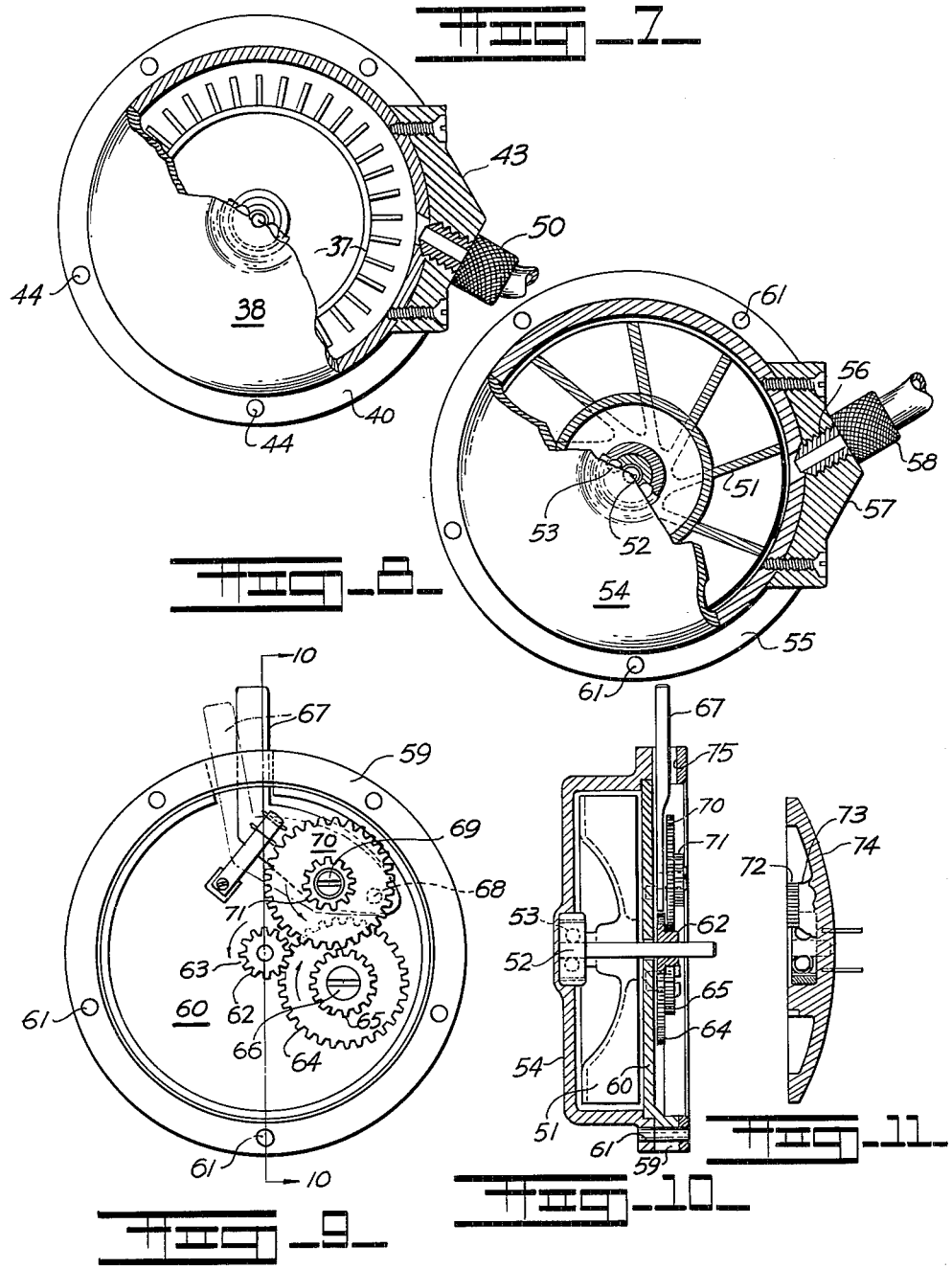
INVENTOR.
Ralph M. Sanders
BY
W. B. Hartman
ATTORNEY.

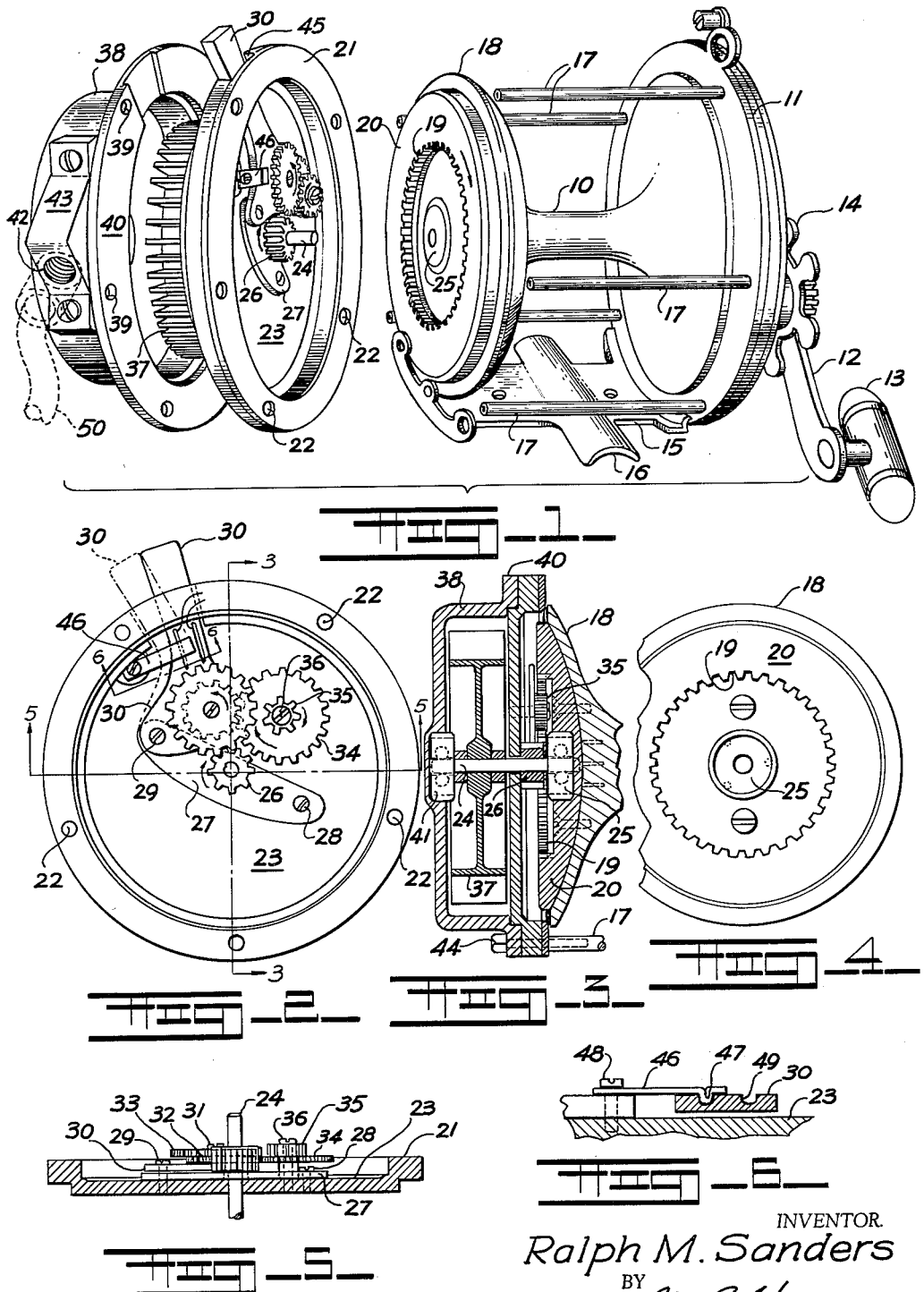

United States Patent Office 3,215,359
Patented Nov. 2, 1965

3,215,359
POWER DRIVEN FISHING REEL
Ralph M. Sanders, 615 Park Place, Rolling Hills,
Pittsburgh, Pa.
Filed Nov. 5, 1962, Ser. No. 235,342
2 Claims. (Cl. 242—84.1)

This invention relates to a fishing reel and more particularly to a reel adapted for use in deep sea fishing and provided with a power rewind mechanism.

The principal object of the invention is the provision of a fishing reel with an air pressure actuated rewind mechanism.

A further object of the invention is the provision of a fishing reel incorporating a conventional spool and manual drive and braking mechanism together with an auxiliary pneumatic rewinding device.

A further object of the invention is the provision of a pneumatically actuated rewinding device adapted to operate a fishing reel and particularly a reel such as those employed in deep sea fishing where a large amount of fishing line is used.

The invention disclosed herein relates to a simple trouble-free power rewind associated with a deep sea fishing reel and utilizing compressed air or gas as a source of power for actuation. Those skilled in the art will observe that in deep sea fishing many hundreds of feet of fishing line are commonly used and that it is necessary from time to time to reel in the line to determine whether or not the hooks are bated.

Heretofore the necessity of reeling in the considerable length of fishing line has presented a problem and there have been efforts to mechanize reels to include power rewinds and such devices incorporating electric motors and the like have heretofore been proposed but have not proved practical in actual operation. The present invention provides both a desirable and practical device. The actual driving mechanism is small, light weight and adds but little bulk to the reel itself and it is conveniently coupled to a source of compressed air or gas by a flexible hose which need be attached only at the actual time of reeling in. A simple motor-driven air compressor or cylinder of compressed gas provides an ample pressure source to actuate one or more of the power-driven reels.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein:

FIGURE 1 is an exploded elevational view of a fishing reel and a pneumatic drive mechanism therefor.

FIGURE 2 is a plan view of a portion of the drive mechanism seen in FIGURE 1.

FIGURE 3 is a vertical section on line 3—3 of FIGURE 2.

FIGURE 4 is an elevation with parts broken away of the driven end portion of the fishing reel seen in FIGURE 1.

FIGURE 5 is a horizontal section on line 5—5 of FIGURE 2.

FIGURE 6 is an enlarged cross-sectional detail of a latch mechanism taken on line 6—6 of FIGURE 2.

FIGURE 7 is an end elevation with parts broken away and parts in cross section illustrating the pneumatic nozzle and turbine as seen in FIGURES 1 and 3 of the drawings.

FIGURE 8 is a plan view of a modification of the pneumatic nozzle and turbine with parts in cross section and parts broken away.

FIGURE 9 is a side elevation of a modification of a gear train which may be used in place of the drive illustrated in FIGURE 2.

FIGURE 10 is a vertical section on line 10—10 of FIGURE 9.

FIGURE 11 is a vertical section through a portion of a reel showing a drive gear thereon for actuation by the device of FIGURES 9 and 10.

By referring to the drawings and FIGURES 1 through 6 and 7, a preferred embodiment of the invention may be seen in which a reel including a spool 10 and a partial housing 11 may be seen, the housing 11 being conventional and incorporating the usual reel actuating crank 12 with a handle 13 together with a selective brake and/or ratchet control 14 as known in the art. The partial housing 11 includes a base plate 15 having an elongated arcuate center section 16 by means of which the reel is secured to a fishing rod and it also includes a series of transversely extending rods 17 which act to space the opposite side of the housing 11 with respect to the spool 10 as known in the art. In the reel shown in the right-hand portion of FIGURE 1, the spool 10 is shown assembled into the partial housing 11 as just described and the lefthand portion of the spool 10 which comprises an annular flange 18 is modified by providing an annular gear pattern 19 on the inner surface of a shoulder 20 formed on or attached to the annular flange 18 of the reel.

A circular member 21 provided with circumferentially spaced openings 22, 22 corresponding with the positioning of the rods 17, 17, heretofore referred to, has a recessed vertical wall 23 through the center of which is positioned a rotatable shaft 24, the end of the rotatable shaft 24 is adapted to be received in a center opening in a bearing 25 in the spool 10 which is located centrally of the annular gear pattern 19 heretofore referred to so that the spool 10 may revolve thereon.

The shaft 24 has a pinion 26 secured thereto which is spaced with respect to the recessed wall 23 by an apertured plate 27 through which the shaft 24 extends. One end of the plate 27 is secured to the recessed wall 23 by a fastener 28 and the other end is secured thereto by a pivot member 29 which also pivotally secures an actuating arm 30. The actuating arm 30 has a secondary pivot 31 thereon on which a pair of superimposed gears 32 and 33 are rotatably mounted, the gears 32 and 33 being secured to one another. The secondary pivot 31 is so positioned that the gear 32 will move into engagement with a secondary gear 34 attached to a drive pinion 35 on a common pivot 36, the common pivot 36 being secured to the recessed wall 23. The drive pinion 35 is normally in engagement with the gear pattern 19 heretofore referred to.

The shaft 24 has a multi-bladed air turbine 37 secured thereto and located on the opposite side of the recessed wall 23 of the circular member 21 as best seen in FIGURES 1 and 3 of the drawings. A secondary housing 38 having circumferentially spaced openings 39 in an annular flange 40 thereof encloses the multi-bladed air turbine 37 and provides an axially aligned journal or anti-friction bearing 41 for the other end of the shaft 24 heretofore referred to. An air nozzle formed as a suitably shaped opening 42 in a fitting 43 attached to the housing 38 provides means for introducing air or gas under pressure at an angle relative to the position of the adjacent blades of the multi-bladed air turbine 37.

By referring now to FIGURE 3 of the drawings, a cross sectional elevation of these several operative parts may be seen and it will be observed that rotation of the multi-bladed air turbine 37 will rotate the shaft 24 which in turn will rotate the pinion 26, and that the shaft 24 is journalled at its opposite ends by the bearings 41 and 25 respectively in anti-friction bearings as illustrated. Thus, the circular member 21 and the secondary housing 38 when secured to the ends of the rods 17 by bolts 44 act to complete the housing about the spool 10 and form the oppositely disposed half of the same with respect to the housing 11 heretofore referred to. It will be observed that the bolts 44 are positioned through the apertures 39 in the flange 40 of the secondary housing 38 and through the apertures 22 in the circular member 21.

By referring again to FIGURES 1 and 2, it will be seen that the actuating arm 30 has a portion thereof which extends vertically and out of a slot 45 in the circular member 21. By referring to FIGURE 2 and FIGURE 3, means for holding the actuating arm 30 in operative or non-operative position may be seen to comprise a spring arm 46 having a detent 47 adjacent its outermost end and the spring arm 46 is secured at its opposite end by a fastener 48 to the recessed wall 23 of the circular member 21. The actuating arm 30 is provided with a pair of spaced grooves or depressions 49, 49 therein arranged for registry with the detent 47 and thereby capable of holding the actuating arm 30 in operative or inoperative position. The inoperative position is shown in broken lines in FIGURE 2 of the drawings and it will be observed that movement of the actuating arm 30 disengages the gear 33 from the pinion 26 as well as the gear 32 from the secondary gear 34 so that the spool 10 is free to rotate with only the drive pinion 35 and the secondary gear 34 revolving therewith and thereby not affecting the normal manual operation of the reel. Broken lines in FIGURE 1 of the drawings indicate an air hose and a quick connect coupling 50 which is attached to supply compressed air or gas for actuating the device as will be understood by those skilled in the art.

Modifications in the construction disclosed herein will occur to those skilled in the art and one such modification is illustrated in FIGURE 8 and relates primarily to a modified form of the air turbine. In FIGURE 8 a modified air turbine 51 is shown with parts broken away and parts in cross section and like the turbine 37 heretofore described in connection with FIGURES 1 through 7 the turbine 51 is secured to a shaft 52 which is journalled in anti-friction bearings 53 and enclosed in a housing 54 which has a peripheral flange 55. An air introducing nozzle is provided in a fitting 57 which is secured to the housing 54 in registry with an opening therein and a quick connect coupling 58 enables a source of air or gas under pressure to be directed against the modified air turbine.

Further modifications may be desirable and one such modification may relate to the manner in which the pneumatically driven mechanism is connected and disconnected to the spool of the reel. In FIGURES 9 and 10, and 11 a modification of such a modified drive mechanism is disclosed. By referring thereto, it will be seen that a circular body member 59 having a recessed wall 60 is provided which compares almost exactly with the circular member 21 heretofore referred to. Apertures 61 in the peripheral edge thereof provide for the reception of fasteners and rods in the same manner as the comparable parts 17 and 44 heretofore referred to. A central shaft 62 having a driven pinion 63 thereon convey the motion imparted to the shaft 62 by an air turbine on the other side of the recessed wall 60 and the driven pinion 63 is in continuous engagement with a gear 64 having a secondary gear 65 secured thereto and both of which are pivotally mounted on a pivot pin 66 attached to the recessed wall 60. An actuating arm 67 is shown in solid lines in disengaged position in FIGURE 9 and in broken lines in engaged position in FIGURE 9 and is pivoted at one of its ends by a pivot 68 to the recessed wall 60. Intermediate its end the actuating arm 67 carries a pivot 69 on which a gear 70 and a drive pinion 71 attached to one another are rotatably positioned. It will be seen that the gear 64 is in constant engagement with the driven pinion 63 and its motion is therefore constantly imparted to the gear 65. When the actuating arm 67 is in disengaged position no driving motion is transmitted to the spool of the reel. When the actuating arm 67 is in engaged position as shown in FIGURE 9 in broken lines the gear 70 engages the gear 65 and the drive pinion 71 engages gear teeth 72 formed on the outer diameter of a shoulder 73 forming a part of or attached to the annular flange 74 of the spool of the reel as shown in FIGURE 11. (The annular flange 74 may be an integral part of the spool or it may be simply keyed thereto as shown in FIGURE 11.)

In FIGURE 10 of the drawings, the completed assembly of the air turbine 51 in the housing 54 and the circular member 59 with its recessed wall 60 may be seen with the various gears heretofore mentioned in proper arrangement. It will be observed that the actuating arm 67 extends upwardly through a slot 75 in the peripheral edge of the circular body member 59. It will be observed that the gearing shown in FIGURES 9, 10 and 11 imparts the same rotary motion to the spool of the reel as the gearing shown in FIGURES 1 through 7 with the exception that the motion is reversed by the gearing shown in FIGURES 9, 10 and 11 as compared with the motion of the device shown in FIGURES 1 through 7 and it is therefore necessary that the air turbines 37 and 51 be driven in opposite directions as herein provided.

It will thus be seen that a fishing reel with a pneumatically actuated power drive rewind mechanism has been disclosed which may be economically formed as an attachment to or an integral part of such a fishing reel and that it will operate to effectively rewind the fishing reel through the use of compressed air or compressed gas from a compressor or a cylinder as may be desired and that the construction disclosed herein meets the several objects of my invention, and having thus described my invention, what I claim is:

1. In a fishing reel including a housing and a spool rotatably mounted therein and manual means for imparting rotary motion to said spool, said manual means including gears and a crank for driving the same; a power device for imparting rotary motion to said spool, said spool having an annular gear pattern on an outer side thereof opposite to said gears and crank, said power device including a gear train mounted in a portion of said housing adjacent said annular gear pattern on said spool, an air turbine chamber having a directional inlet opening in said housing, an air turbine rotatably positioned in said chamber, a shaft common to said turbine and one of said gears in said gear train, one end of said spool of said reel being journalled on said shaft an actuating arm pivoted to said housing adjacent said gear train, at least one of the other gears in said gear train being pivotally mounted on said actuating arm and movable thereby into and out of engagement with another one of the gears in said gear train.

2. The fishing reel set forth in claim 1 and wherein said housing includes a wall spaced with respect to said spool and wherein said actuating arm and said gear train are positioned between said wall and said spool and wherein bearings are positioned in said housing and in said spool respectively and wherein said shaft extends through said wall and is journalled in said bearings and wherein said wall defines one portion of said air chamber.

References Cited by the Examiner
UNITED STATES PATENTS

| | | | |
|---|---|---|---|
| 1,580,986 | 4/26 | Aberson | 242—84.1 |
| 1,766,086 | 6/30 | Russell | 242—84.54 |
| 1,978,474 | 10/34 | Nye | 242—18 |
| 3,017,134 | 1/62 | Duvall | 242—84.1 X |

MERVIN STEIN, *Primary Examiner.*

RUSSELL C. MADER, *Examiner.*